(12) United States Patent  (10) Patent No.: US 9,081,750 B2
Dake et al.  (45) Date of Patent: Jul. 14, 2015

(54) RECOVERY ESCALATION OF CLOUD DEPLOYMENTS

(75) Inventors: Steven Charles Dake, Scottsdale, AZ (US); Angus Salkeld, Eaglemont (AU)

(73) Assignee: Red Hat, Inc., Raleigh, NC (US)

( * ) Notice: Subject to any disclaimer, the term of this patent is extended or adjusted under 35 U.S.C. 154(b) by 443 days.

(21) Appl. No.: 13/408,632

(22) Filed: Feb. 29, 2012

(65) Prior Publication Data

US 2013/0227335 A1  Aug. 29, 2013

(51) Int. Cl.
*G06F 11/00* (2006.01)
*G06F 11/20* (2006.01)
*G06F 11/07* (2006.01)
*G06F 11/14* (2006.01)

(52) U.S. Cl.
CPC .......... *G06F 11/203* (2013.01); *G06F 11/0709* (2013.01); *G06F 11/0712* (2013.01); *G06F 11/0793* (2013.01); *G06F 11/1438* (2013.01); *G06F 11/2025* (2013.01); *G06F 11/1482* (2013.01); *G06F 11/2035* (2013.01)

(58) Field of Classification Search
CPC . G06F 9/5072; G06F 11/2025; G06F 11/203; G06F 11/0712
USPC ........................................................ 714/4.11
See application file for complete search history.

(56) References Cited

U.S. PATENT DOCUMENTS

2008/0307259 A1* 12/2008 Vasudevan et al. ............. 714/23
2012/0110186 A1*  5/2012 Kapur et al. .................. 709/226
2012/0297238 A1* 11/2012 Watson et al. ................ 714/4.11

* cited by examiner

*Primary Examiner* — Jigar Patel
(74) *Attorney, Agent, or Firm* — Lowenstein Sandler LLP

(57) ABSTRACT

Methods and systems for escalating component failures in a cloud are provided. A cloud controller of a cloud receives an indication that a collection of virtual machines of the first cloud has failed based on a collection of virtual machines escalation policy. The cloud controller initiates relocating the collection of virtual machines to a second cloud.

16 Claims, 8 Drawing Sheets

RECOVERY ESCALATION OF CLOUD DEPLOYMENTS

TECHNICAL FIELD

Embodiments of the present invention relate to cloud computing systems, and more specifically, to a method and apparatus for escalating failures in a cloud computing environment.

BACKGROUND

Cloud computing is the provision of dynamically scalable and often virtualized resources as a service over the Internet on a utility basis. Users need not have any knowledge of, expertise in, or control over the technology infrastructure in the "cloud" that supports them. Cloud computing services often provide common business applications online that are accessed from a web browser, while the software and data are stored on servers.

Cloud computing customers do not generally own the physical infrastructure serving as host to the software platform in question. They typically consume resources as a service and pay only for resources that they use. The majority of cloud computing infrastructures typically include services delivered through data centers and built on servers with different levels of virtualization technologies. The services are accessible from various locations that provide access to networking infrastructure. Clouds often appear as single points of access for all consumers' computing needs.

Cloud computing is quickly becoming the platform of choice for businesses that want to reduce operating expenses and be able to scale resources rapidly. Eased automation, flexibility, mobility, resiliency, and redundancy are several other advantages of moving resources to the cloud. On-premise private clouds permit businesses to take advantage of cloud technologies while remaining on a private network. Public clouds permit businesses to make use of resources provided by third party vendors. Hybrid clouds permit the best of both public and private cloud computing models. Many organizations are being introduced to cloud computing by building an on-premise Infrastructure-as-a-Service (IaaS) cloud, which delivers computing, storage, and networking resources to users. Some organizations utilize cloud computing technology in an evolutionary way that leverages and extends their existing infrastructure and maintains portability across different technology stacks and providers.

One or more virtual machines (VMs) may be employed in a cloud. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs. Virtualization systems provide a potential means to access computing resources in a confidential and anonymous way.

High availability, when applied to computer systems in general and cloud computing systems in particular, refers to the application of well-known techniques to improve availability (A) as defined by the equation A=MTBF/(MTTR+MTBF), where MTTR refers to mean time to recovery and MTBF refers to mean time between failures. MTBF is the predicted elapsed time between inherent failures of a system during operation. MTTR is the average time that a device may take to recover from any failure. Reducing MTTR may include the automation of manual operations of activities such as, but not limited to, fault detection, fault isolation, fault recovery, and administrative repair.

For software, increasing MTBF may include, but is not limited to, technical source code reviews, high quality automated validation, minimizing complexity, and employing software engineers having a mixture of levels of experience. For hardware, increasing MTBF may include, but is not limited to, using higher quality components, preemptively replacing hardware components prior to predicted wear out, and employing a sufficient burn in period to remove infant mortalities from a product delivery stream.

Current cloud high availability solutions focus on passive monitoring of a virtual machine. If the infrastructure (e.g., the hypervisor or virtual machine monitor) returns an indicator that the virtual machine has in some way failed, the virtual machine is restarted. In case of an infrastructure related problem, the virtual machine is restarted continuously.

Existing bare-metal high availability products execute recovery escalation of a cluster node by turning off and on power to that node (power fencing). If the node fails repeatedly, there is no further escalation that takes place (e.g., permanently terminating the power to the node until an operator intervenes). Some attempts have been made to provide to escalate failures from a lower level to a higher level component of a bare-metal cluster of computer nodes.

In a conventional bare metal systems model, a "service unit" includes multiple software applications. If an application fails to meet a user defined policy, the service unit is failed. If a service unit fails repeatedly, a higher level component called a service group may be restarted. If the service group fails repeatedly, no further escalation is taken.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for escalating failures in a cloud computing environment are described herein. In one embodiment, a health monitor of an application running on an individual virtual machine of a first cloud receives an indication that the application has failed. If the application fails according to an application escalation policy, then the indication that the application has failed is escalated to a health monitor of the individual virtual machine. The health monitor of the individual virtual machine may receive an indication that the individual virtual machine (VM) has failed. If the individual VM fails according to a virtual machine escalation policy, then the indication that the individual VM has failed is escalated to a collection of virtual machines health monitor. If the collection of virtual machines fails according to a collection of virtual machines escalation policy, then an indication that the collection of virtual machines has failed is escalated to a cloud health monitor. The cloud health monitor initiates relocating the collection of virtual machines to a second cloud.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
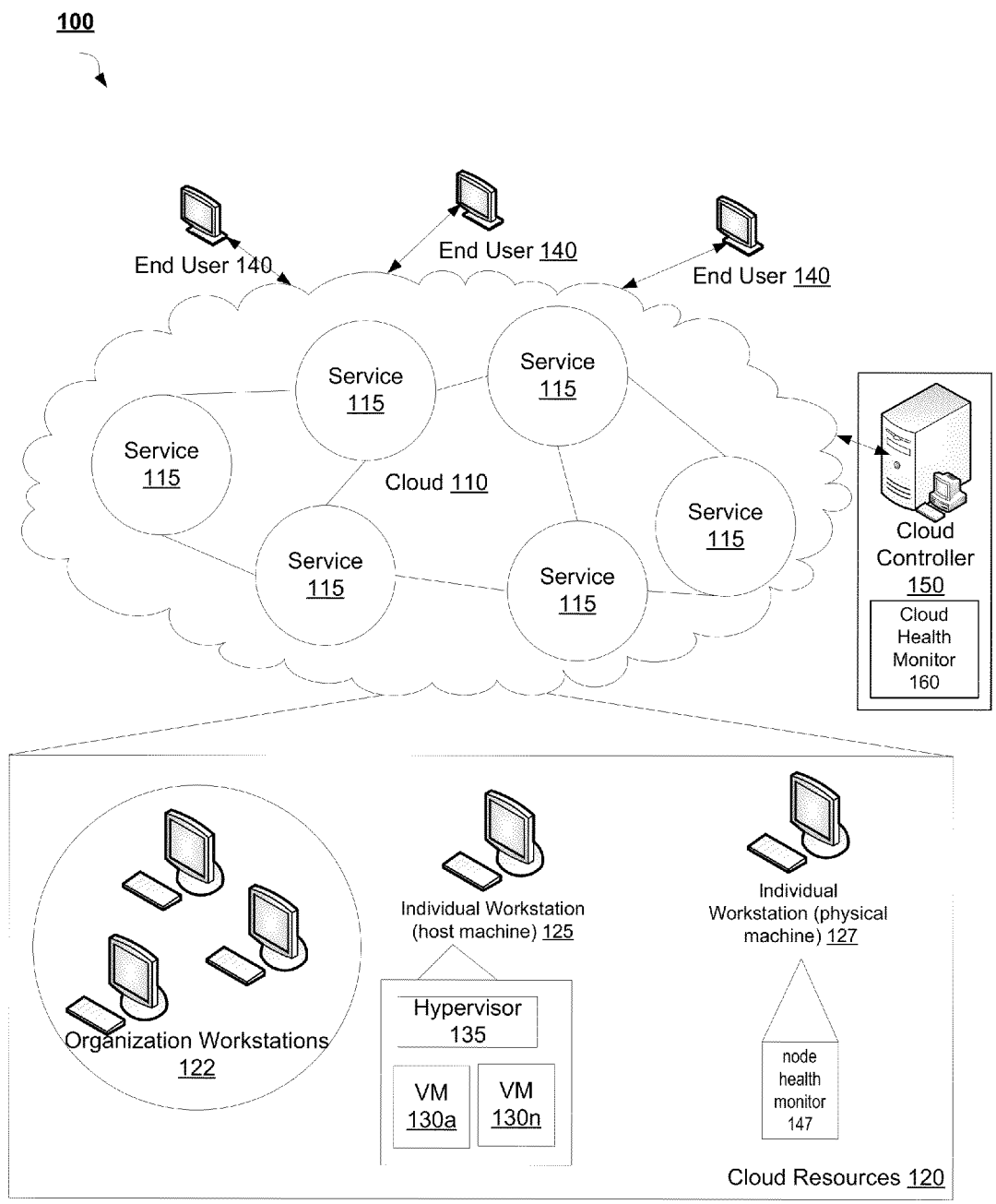
FIG. 1 illustrates an exemplary cloud computing architecture in which embodiments of the present invention may operate.

FIG. 1 illustrates an exemplary cloud computing architecture 100 for implementing a cloud computing failure escalation policy in which embodiments of the present invention may operate. The cloud computing architecture 100 may include a cloud 110 comprising dynamically scalable and virtualized resources used to provide services 115 over the Internet. One or more end users 140 may access and utilize the services 115 via client devices without having to maintain dedicated hardware on their end. In one embodiment, a cloud controller 150 is provided to manage the resources and services of the cloud 110. In one embodiment, a cloud health monitor 160 of the cloud controller 150 is configured to oversee and execute in part a cloud computing failure policy. In one embodiment, the cloud health monitor 160 of the cloud controller 150 is configured to receive an indication that a collection of virtual machines 130a-130n of the cloud 110 has failed based on a collection of virtual machines escalation policy and is configured to initiate relocating the collection of virtual machines 130a-130n to a second cloud (not shown) described below.

In some embodiments, a host controller 125 may reside on a designated computer system (e.g., a server computer, a desktop computer, etc.) or be part of a host machine 125 or another machine.

As illustrated, a break-out box of the cloud 110 shows the cloud resources 120 including hardware that may be employed by embodiments of the invention as computing resources of the cloud 110. Embodiments of the invention may utilize one or more organization workstations 122 or host machines 125 to execute the collection of virtual machines (VMs) 130a-130n that may be used as cloud computing resources. In embodiments of the invention, each host machine 125 is capable of running one or more virtual machines (VMs) 130a-130n. Each of the VMs 130a-130n runs a guest operating system (OS) that may be different from one another. The guest OS may include Microsoft Windows, Linux, Solaris, Mac OSX, etc. The host machine 125 may include a hypervisor 135 that emulates the underlying hardware platform for the VMs 130a-130n. The hypervisor 135 may also be known as a virtual machine monitor (VMM), a kernel-based hypervisor, or a host operating system. In one embodiment, each of the VMs 130a-130n may be accessed by one or more of clients over a network (not shown). The network may be a private network (e.g., a local area network (LAN), wide area network (WAN), intranet, etc.) or a public network (e.g., the Internet).

In another embodiment, one or more organized workstations 122 or physical machines 127 (i.e., the nodes 127) may be utilized directly as cloud computing resources.

Figure 2:
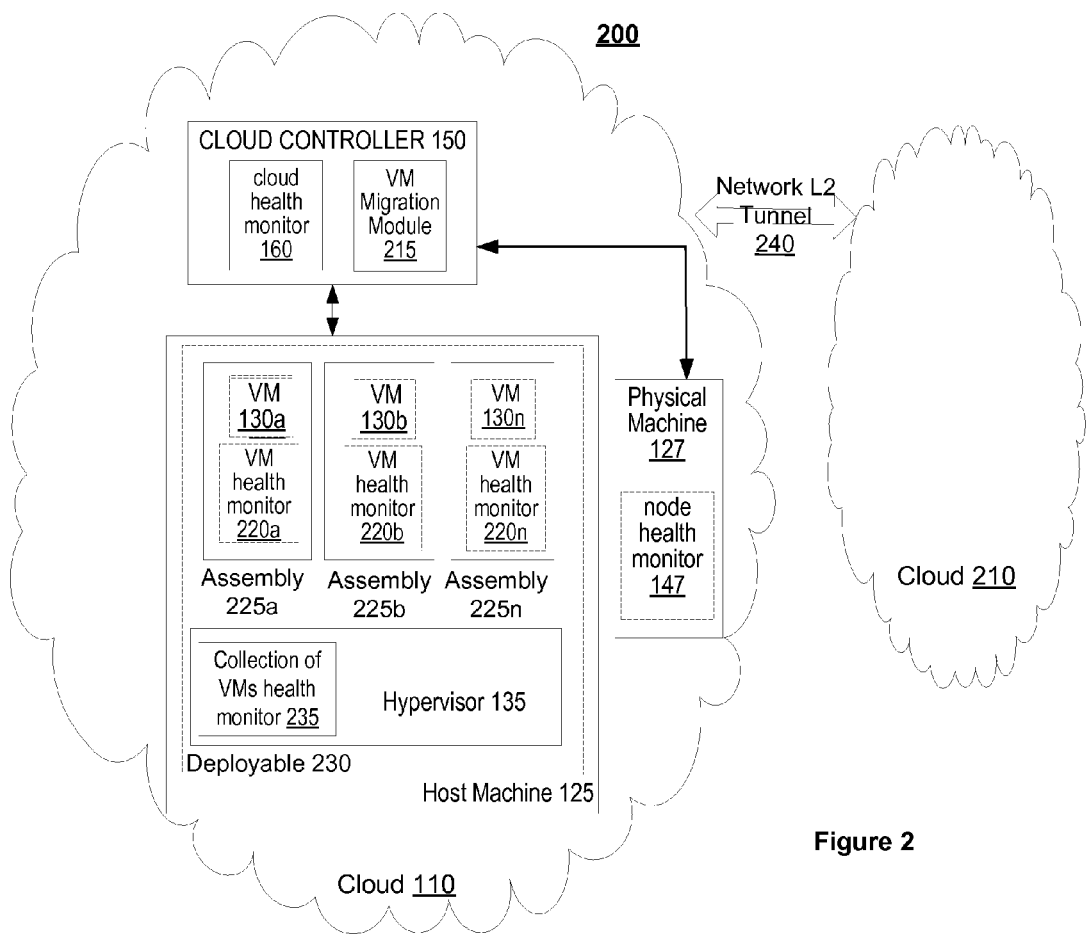
FIG. 2 illustrates a multiple-cloud computing architecture for implementing a cloud computing failure escalation policy in which embodiments of the present invention may operate.

FIG. 2 illustrates a multiple-cloud computing architecture 200 for implementing a cloud computing failure escalation policy in which embodiments of the present invention may operate. Multiple-cloud computing architecture 200 includes the cloud 110 and a second cloud 210. One or both of the clouds 110, 210 may be private, public, hybrid, internal, or external cloud. One or both of the clouds 110, 210 may be part of an enterprise cloud computing solution, produced by, but not limited to, Red Hat (Cloud Forms), Abiquo, BMC, CA, Cloud.com, Dell, Enomaly, Eucalyptus, Hexagrid, HP, IBM, Microsoft, Platform Computing, Tibco, and VMWare. Each cloud is managed by a cloud controller 150.

In one embodiment, the cloud controller 150 is part of an enterprise virtualization solution. In one embodiment, the cloud controller 150 is part of an enterprise virtualization solution. The cloud 110 may include one or more physical machines 127. In one embodiment, individual applications (not shown) may be instantiated, started, and executed on one or more of the individual physical machines 127. The one or more physical machines may each include an active node health monitor (e.g., 147) which is configured to apply a failure policy and to receive health status of the physical machine (e.g., 127) internally.

In an embodiment, the cloud 110 includes one or more host machines 125 each including a hypervisor 135 configured to virtualize the resources of the host machine 125 for the execution of one or more VMs 130a-130n. In one embodiment, individual applications (not shown) may be instantiated, started, and executed on one or more of the individual VMs 130a-130n. The VMs 130a-130n may be grouped into corresponding assemblies 225a-225n. In one embodiment, an assembly (e.g., one of 225a-225n) may be defined as a virtual machine (e.g., one of 130a-130n) plus an active VM health monitor (e.g., one of 220a-220n) which monitors the health of the virtual machine (e.g., one of 130a-130n) internally. In one embodiment, health is defined as whether a resource or VM is able to provide service. If it is able to provide service, it is healthy, if it is not able to provide service, it is not healthy (failed). In one embodiment, monitoring the health of the one or more virtual machines (e.g., one or more of 130a-130n) may include disk resources, memory resources, whether processes can be scheduled, whether the virtual machine is overloaded. In an embodiment, any metric that can be used to determine the health of the system may be used.

In an embodiment, a resource (application) may be monitored, including whether the resource can provide service, whether it is operating past overload design considerations, whether it is running or not running, etc.

One or more of the assemblies 225a-225n may be grouped into a deployable 230. In one embodiment, a deployable 230 may be defined as a collection of assemblies 225a-225n (e.g., the individual VMs 130a-130n, their corresponding hypervisor 135, plus an active collection of virtual machines health monitor 235 within the hypervisor 135, configured to check the health of the collection of VMs 130a-130n internally).

Although FIG. 2 depicts one deployable 230 mapped to one hypervisor 135, in another embodiment, multiple deployables 230 may run on one hypervisor 135. Finally, the cloud controller 150 may include an active cloud health monitor 160 which monitors the health of one or more collections of deployables 230 internally.

In one embodiment, any component that fails in a deployable 230 indicates the entire deployable 230 has failed. This could mean a resource in an assembly 225a-225n (e.g., the individual VMs 130a-130n) fails, or an entire VM becomes unhealthy (e.g., a kernel can't schedule processes, a disk is full, etc.). An application may fail by receiving an abort or segfault signal, or could be terminated out of band by the kernel or administrator, or could stop providing service but have appearances of being active in the system.

In one embodiment, monitoring the health of the one or more collections of deployables 230 may include whether the collections of deployables 230 is overloaded, unable to provide full service, or able to provide some degraded level of service.

In response to a collection of virtual machines 130a-130n (i.e. the deployable 230) escalation policy including a response to one or more failures of one or more deployables 230, the active cloud health monitor 160 may alert a VM migration module 215 within the cloud controller 150 to initiate a transfer of an entire collection of virtual machines 130a-130n and the hypervisor 135 including the collection of VMs health monitor 235 (i.e., of the deployable 230) over to the second cloud 210.

In one embodiment, failures of deployables 230 may include an escalation of a failure from a lower level component, which may include a failure in an individual virtual machine (e.g., 130a) of the collection of virtual machines 130a-130n, or an escalation from an application running on the individual virtual machine (e.g., 130a).

Any one, some, or all of the application escalation policies, the virtual machine (assembly) escalation policies, and the collection of virtual machines (deployable) escalation policies may be based on, but not limited to, a predetermined number of times a component has failed in a predetermined time interval. An example policy may be: "if object fails 5 times in 30 minutes, escalate to a failure of its contained component." A person skilled in the art having the benefit of this disclosure would appreciate that there may be many types of escalation policy criteria.

During the transfer, the deployable 230 may be terminated on the first cloud 110 and restarted on the second cloud 210.

To optimize productivity of the cloud 110, workloads of the collection of VMs 130a-130n (i.e., the deployable 230) may be transferrable from one cloud (i.e., the cloud 110) to another (i.e., the cloud 210). In one embodiment, the cloud controller 150 may oversee the migration of the collection of VMs 130a-130n of the deployable 235 from the cloud 110 to the cloud 210 by means of an L2 (layer-2) network tunnel 240.

L2 is a term in the OSI model and refers to the data link layer. This is the layer directly above the physical layer and is responsible for transmitting packets between computers that are connected to the same LAN. An example of an L2 protocol is Ethernet. Higher level protocols, like IP and TCP exist in higher levels (3 and 4 respectively). By tunneling on the L2 level, the two sides that are connected via the tunnel are "merged" and look like they are on the same physical LAN. Because Live Migration works on the LAN (more accurately: inside an "L2 domain"), the tunnel should be at the L2 level and not at a higher level.

In an embodiment, a high availability cloud service is operable to deliver maximum application service availability for a collection of deployables 230. This is achieved by the detection and recovery of failures in any of the following components: monitored applications (not shown), assemblies 225a-225n, and deployables 230. Recovery from a detected failure may require terminations of components of the deployable 230. The restarting of components is controlled by the cloud health monitor 160, the collection of VMs health monitor 235, or the individual VM health monitors 220a-220n.

Figure 3:
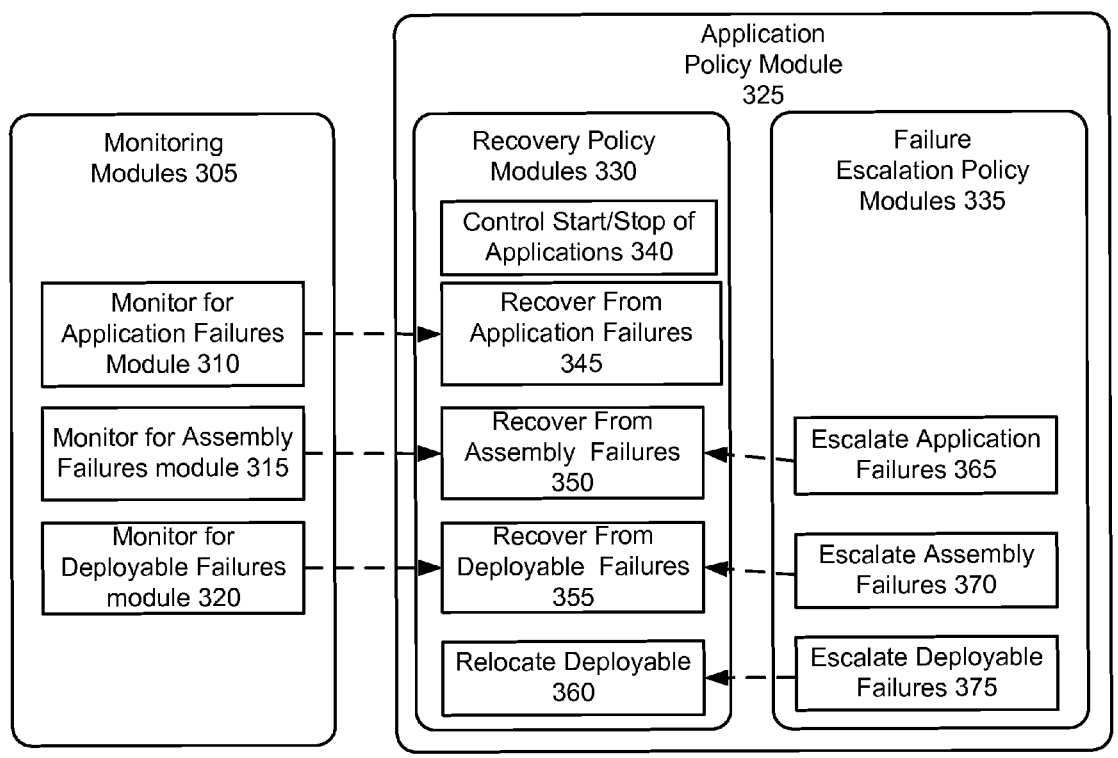
FIG. 3 illustrates one embodiment of a high availability service architecture that configured to escalate failures.

FIG. 3 illustrates one embodiment of a high availability service architecture that is configured to escalate failures. The purpose of escalating failures is to permit a repetitive lower level failure to be recovered using a higher level recovery. The high availability service includes monitoring modules 305, which may include a monitor for application failures module 310, a monitor for assembly failures module 315 (i.e., for an individual virtual machine 130a), and a monitor for deployable failures module 320 (i.e., for a collection of virtual machines 130a-130n).

A response to one or more failures is guided by an application policy module 325, which includes a recovery policy module 330 and a failure escalation policy module 335. The recovery policy module 330 includes a control start/stop of applications module 340, a recover from application failures module 345 in communication with the monitor for applications failures module 310, a recover from assembly failures module 350 in communication with the monitor for assembly failures module 315, a recover from deployable failures module 355 in communication with the monitor for deployable failures module 355, and a relocate deployable module 360 configured to transfer a deployable from one cloud to another cloud. The failure escalation policy module 335 includes an escalate application failures module 365 in communication with the recover from assembly failures module 350, an escalate assembly failures module 370 in communication with the recover from deployable failures module 355, and an escalate deployable failures module 375 in communication with the relocate deployable module 360.

Figure 4:
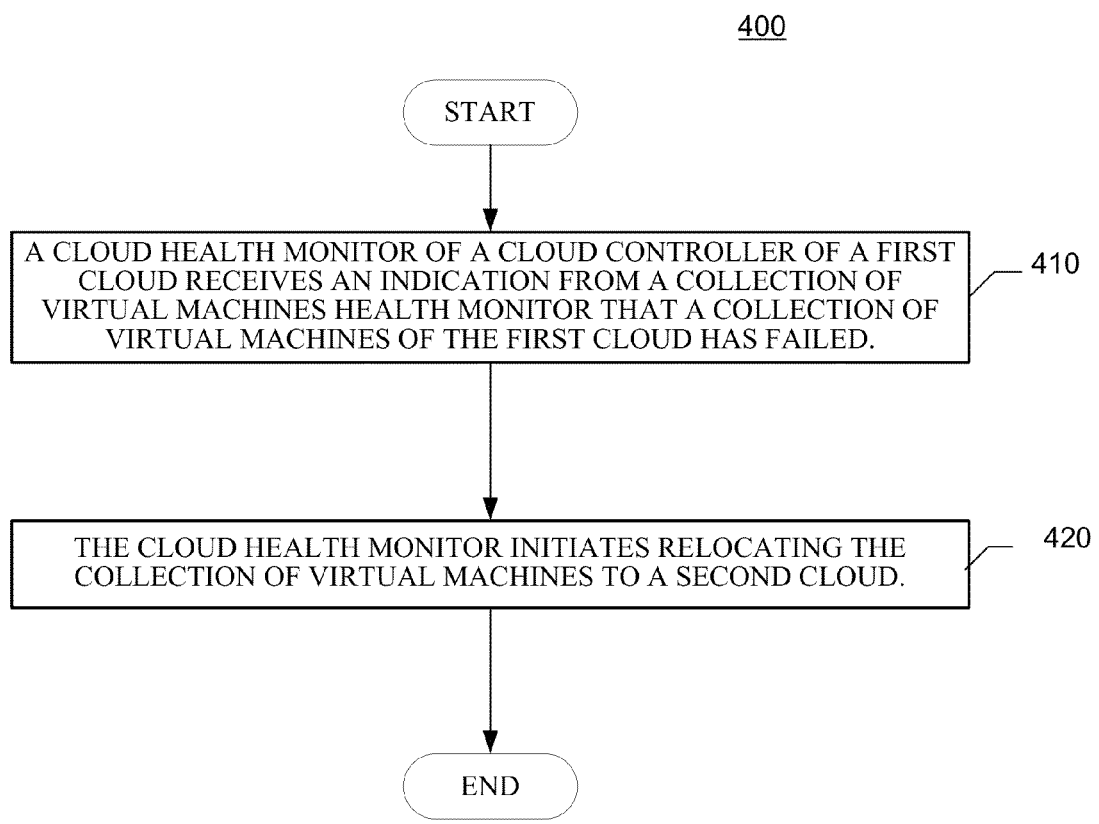
FIG. 4 is a flow diagram illustrating one embodiment of a method for escalating a failure of a collection of virtual machines in a cloud computing environment.

FIG. 4 is a flow diagram illustrating one embodiment of a method 400 for escalating a failure of a collection of virtual machines 130a-130n in a cloud computing environment. Method 400 may be performed by processing logic (e.g., in computer system 800 of FIG. 8) of a cloud health monitor (e.g., the cloud health monitor module 160 of FIG. 2) of a cloud controller (e.g., the cloud controller 150 of FIG. 2) of a cloud (e.g., the cloud 110 of FIG. 2) that may comprise hardware (e.g., circuitry, dedicated logic, programmable logic, microcode, etc.), software (such as instructions run on a processing device), firmware, or a combination thereof.

At block 410, a cloud health monitor 160 of a cloud controller 150 of a first cloud 110 receives an indication that a collection of virtual machines 130a-130n of the first cloud 110 has failed according to a collection of virtual machines escalation policy from a collection of virtual machines health monitor 235. At block 420, the cloud health monitor 160 initiates relocating the collection of virtual machines 130a-130n to a second cloud 210.

Figure 5:
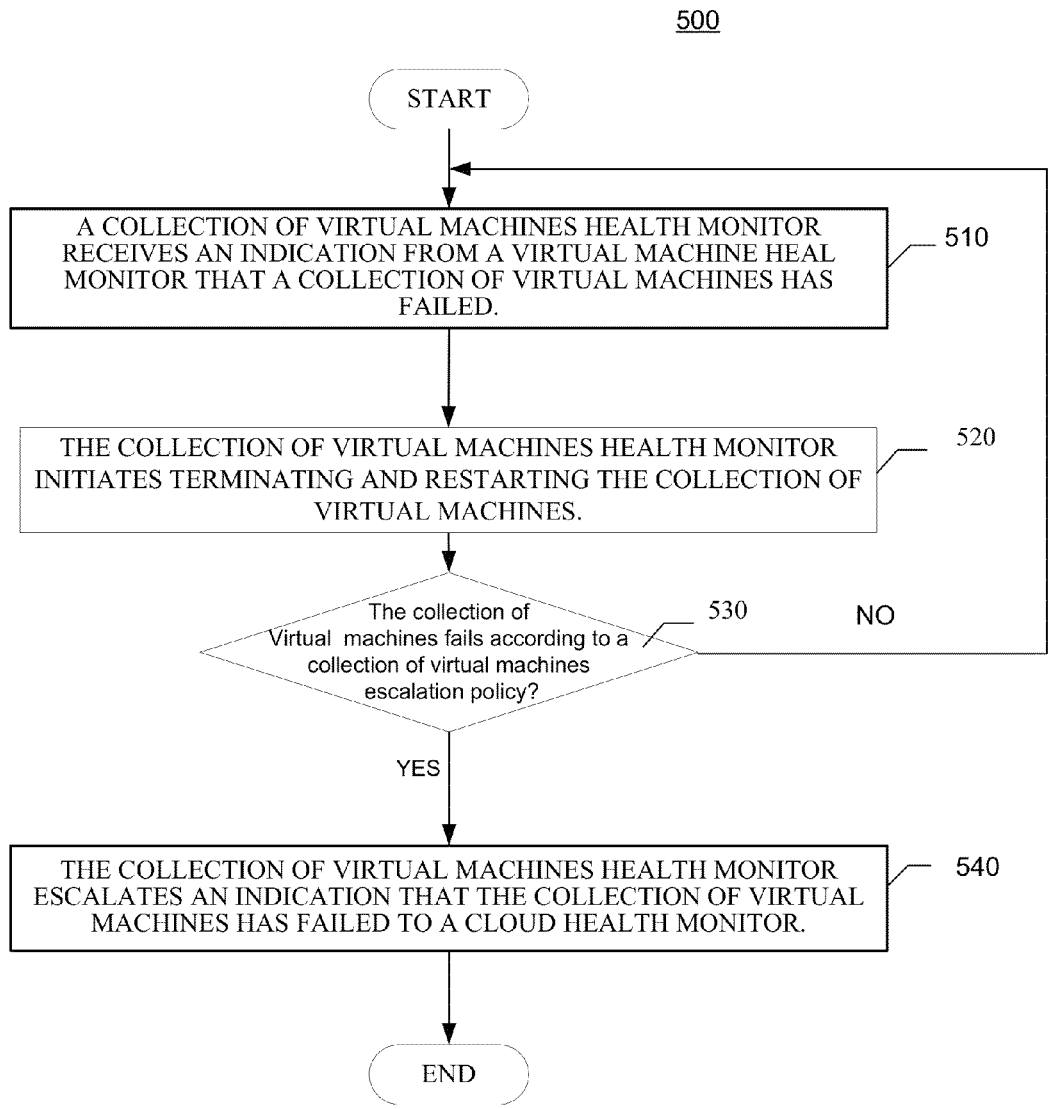
FIG. 5 is a flow diagram illustrating one embodiment of a method for escalating a failure of a virtual machine to a failure of a collection of virtual machines in a cloud computing environment.

FIG. 5 is a flow diagram illustrating one embodiment of a method 500 for escalating a failure of a virtual machine 130a to a failure of a collection of virtual machines 130a-130n in a cloud computing environment. Method 500 may be performed by processing logic (e.g., in computer system 800 of FIG. 8) of a collection of virtual machines health monitor (e.g., the collection of virtual machines health monitor 235 of FIG. 2) that may comprise hardware (e.g., circuitry, dedicated logic, programmable logic, microcode, etc.), software (such as instructions run on a processing device), firmware, or a combination thereof.

At block 510, a collection of virtual machines health monitor 235 receives an indication that a collection of virtual machines 130a-130n has failed from a virtual machine health monitor 220a. At block 520, the collection of virtual machines health monitor 235 initiates terminating and restarting the collection of virtual machines 130a-130n. If, at block 530, the collection of virtual machines 130a-130n fails according to a collection of virtual machines escalation policy, then at block 540, the collection of virtual machines health monitor 235 escalates an indication that the collection of virtual machines 130a-130n has failed to a cloud health monitor 160 of a cloud controller 150.

Figure 6:
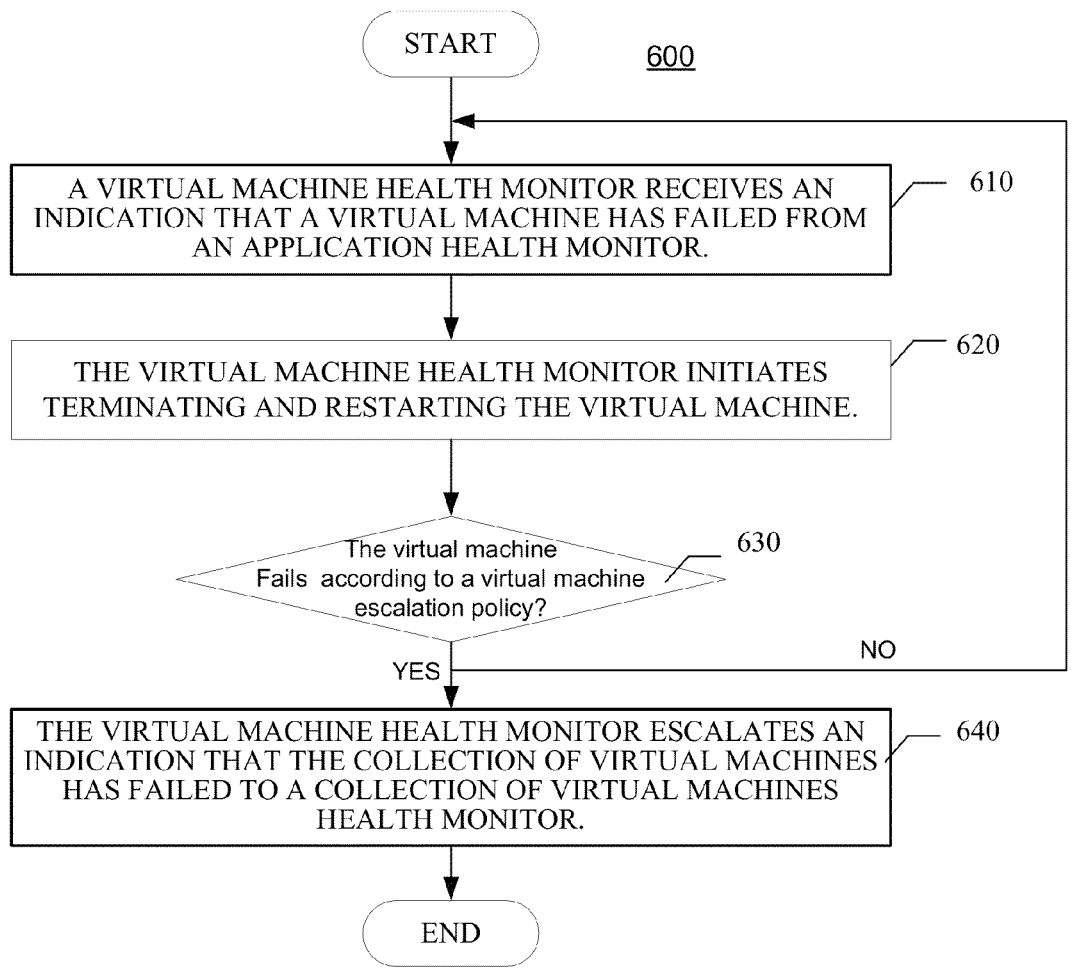
FIG. 6 is a flow diagram illustrating one embodiment of a method for escalating a failure of a virtual machine to a failure of a collection of virtual machines in a cloud computing environment.

FIG. 6 is a flow diagram illustrating one embodiment of a method 600 for escalating a failure of a virtual machine 130a to a failure of a collection of virtual machines 130a-130n in a cloud computing environment. Method 600 may be performed by processing logic (e.g., in computer system 800 of FIG. 8) of a virtual machine health monitor (e.g., the virtual machine health monitor 220a of FIG. 2).

At block 610, a virtual machine health monitor 220a receives an indication that a virtual machine 130a has failed from an application health monitor (not shown). At block 620, the virtual machine health monitor 220a initiates terminating and restarting the virtual machine 130a. If, at block 630, the virtual machine 130a fails according to a virtual machine escalation policy, then at block 640, the virtual machine health monitor 220a escalates an indication that the collection of virtual machines 130a-130n has failed to a collection of virtual machines health monitor 230.

Figure 7:
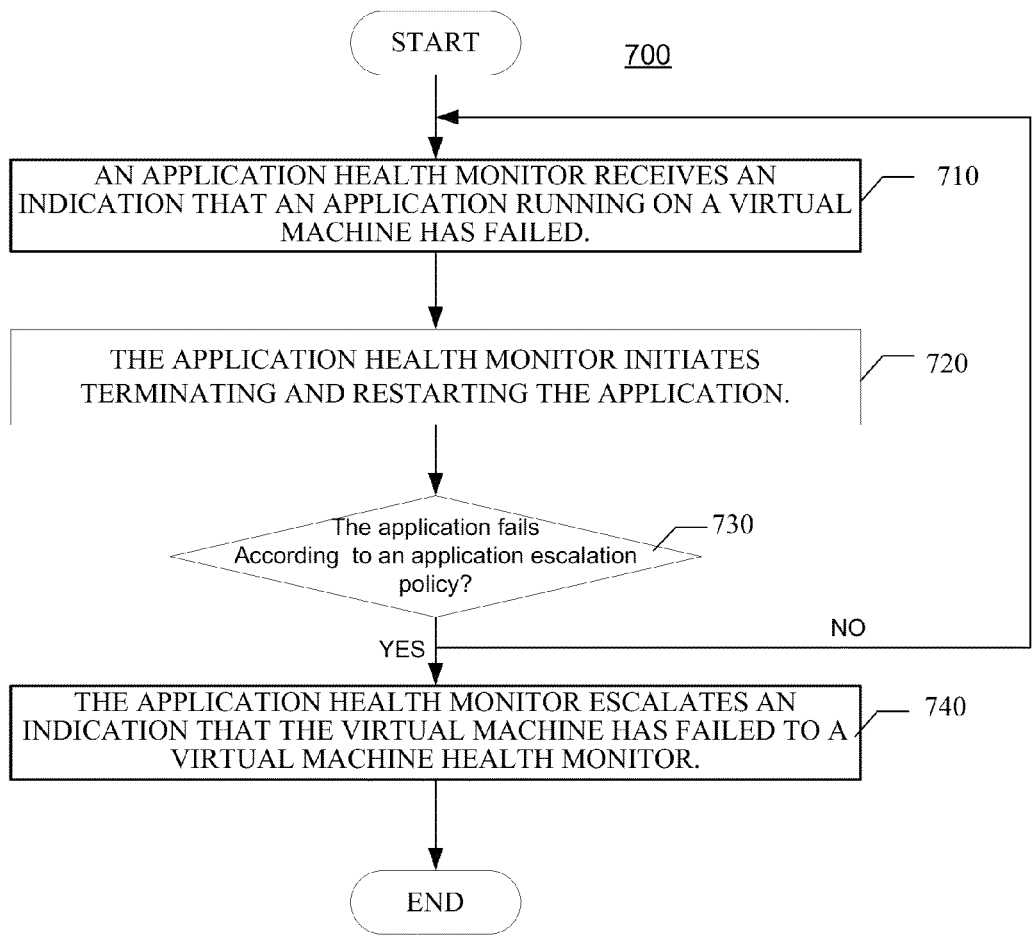
FIG. 7 is a flow diagram illustrating one embodiment of a method for escalating a failure of an application running on a virtual machine to a failure of a virtual machine in a cloud computing environment.

FIG. 7 is a flow diagram illustrating one embodiment of a method 700 for escalating a failure of an application running on a virtual machine 130a to a failure of a virtual machine 130a in a cloud computing environment. Method 700 may be performed by processing logic (e.g., in computer system 800 of FIG. 8) of an application health monitor module (not shown) that may comprise hardware (e.g., circuitry, dedicated logic, programmable logic, microcode, etc.), software (such as instructions run on a processing device), firmware, or a combination thereof.

At block 710, an application health monitor (not shown) receives an indication that an application running on a virtual machine 130a has failed. At block 720, the application health monitor initiates terminating and restarting the application. If, at block 730, the application fails according to an application escalation policy, then at block 740, the application health monitor escalates an indication that the virtual machine 130a has failed to a virtual machine health monitor 220a.

In FIGS. 2 and 3, for example, in one embodiment, the monitor for application failures module 310 of the VM 130a receives a message that an application (not shown) has failed. The monitor for application failures module 310 sends a recovery message to the recovery from applications failure module 345 in the VM 130a. As a result, the recovery from application failures module 345 of the application health monitor (not shown) restarts the application on the VM 130a via a message sent to the control start/stop applications module 340. If, the application fails according to an application escalation policy, then the indication that the application has failed is escalated to the virtual machine health monitor 220a. In one embodiment, the escalate application failures module 365 of the application health monitor (not shown) sends a message to the recovery from assembly failures module 350 in the VM health monitor 220a.

The VM health monitor 220a terminates and restarts the VM 130a (i.e., the assembly 225a). The VM health monitor 220a receives an indication that the individual VM 130a has failed from the application health monitor (not shown). If the individual VM 130a fails according to a virtual machine escalation policy, then the indication that the individual VM 130a has failed is escalated to the VM collection health monitor 235. In one embodiment, the escalate assembly failures module 370 of the VM health monitor 220a of the assembly 225a sends a message to the recovery from deployable failures module 355 in the VM collection health monitor 235 that the assembly 225a has failed.

The VM collection health monitor 235 terminates and restarts the collection of virtual machines 130a-130n (i.e., the deployable 230). If the collection of virtual machines 130a-130n (i.e., the deployable 230) fails according to a collection of virtual machines escalation policy, an indication that the collection of virtual machines 130a-130n has failed is escalated to the cloud health monitor 160. The cloud health monitor 160 initiates relocating the collection of virtual machines 130a-130n (i.e., the deployable 230) to the second cloud 210.

In one embodiment, the escalate deployable failures module 375 of the VM collection health monitor 235 of the deployable 230 sends a message to the relocate deployable module 360 in the cloud health monitor 160 of the cloud controller 150. The cloud controller 150 terminates the deployable 230 and initiates relocating the deployable 230 from the first cloud 110 to the second cloud 210.

Figure 8:
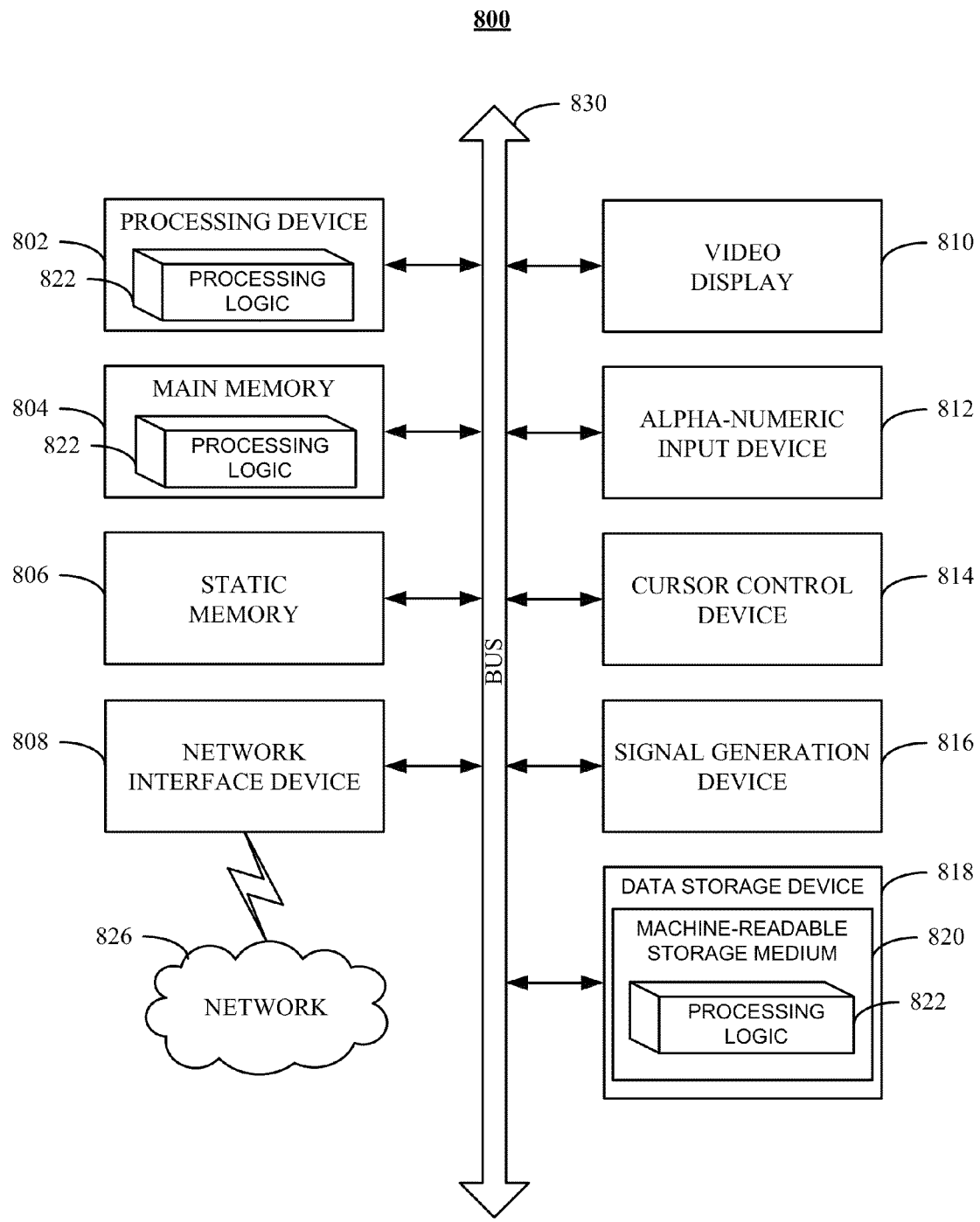
FIG. 8 illustrates a diagrammatic representation of a machine in the exemplary form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 530.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute device queue manager logic 822 for performing the operations and steps discussed herein.

Computer system 800 may further include a network interface device 808. Computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Data storage device 818 may include a machine-readable storage medium (or more specifically a computer-readable storage medium) 820 having one or more sets of instructions (e.g., processing logic 522) embodying any one or more of the methodologies of functions described herein. Processing logic 822 may also reside, completely or at least partially, within main memory 804 and/or within processing device 802 during execution thereof by computer system 800; main memory 804 and processing device 802 also constituting machine-readable storage media. Processing logic 822 may further be transmitted or received over a network 826 via network interface device 808.

Machine-readable storage medium 820 may also be used to store the device queue manager logic persistently. While machine-readable storage medium 820 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
receiving, by a monitor associated with a collection of virtual machines residing on a host machine of a first cloud computing system, from a monitor associated with an individual virtual machine of the collection of virtual machines, a first indication that the individual virtual machine has failed in view of an escalation policy for the individual virtual machine;
responsive to the monitor associated with the collection of virtual machines receiving the first indication from the monitor associated with the individual virtual machine, terminating and restarting the collection of virtual machines by the monitor associated with the collection of virtual machines residing on the host machine;

receiving, by a monitor associated with a cloud controller of the first cloud computing system, a second indication that the collection of virtual machines has failed in view of an escalation policy for the collection of virtual machines; and responsive to the monitor associated with the cloud controller of the first cloud computing system receiving the second indication from the monitor associated with the collection of virtual machines, initiating relocating, by the cloud controller, the collection of virtual machines to a second cloud computing system.

2. The method of claim 1, wherein initiating relocating the collection of virtual machines to a second cloud computing system comprises terminating the collection of virtual machines of the first cloud computing system and sending a message to a cloud controller of the second cloud computing system to restart the collection of virtual machines on the second cloud computing system.

3. The method of claim 1, wherein the escalation policy for an individual virtual machine is based on a predetermined number of times the individual virtual machine has failed in a predetermined time interval.

4. The method of claim 1, further comprising receiving an indication that an application running on the individual virtual machine has failed in view of an escalation policy for an application.

5. The method of claim 4, further comprising, when the application has failed, terminating and restarting the individual virtual machine.

6. The method of claim 4, wherein the escalation policy for an application is in view of a predetermined number of times the application has failed in a predetermined time interval.

7. The method of claim 1, wherein at least one of the first cloud computing system or the second cloud computing system is a private cloud computing system, a public cloud computing system, or a hybrid cloud computing system.

8. A system, comprising:
 a memory;
 a processing device, operatively coupled to the memory, to:
  receive, by a monitor associated with a collection of virtual machines residing on a host machine of a first cloud computing system, from a monitor associated with an individual virtual machine of the collection of virtual machines, a first indication that the individual virtual machine has failed in view of an escalation policy for the individual virtual machine;
  responsive to the monitor associated with the collection of virtual machines receiving the first indication from the monitor associated with the individual virtual machine,
   terminate and restart the collection of virtual machines by the monitor associated with the collection of virtual machines residing on the host machine;
  receive, by the monitor associated with a cloud controller a second indication that the collection of virtual machines has failed in view of an escalation policy for the collection of virtual machines; and
 responsive to the monitor associated with the cloud controller of the first cloud computing system receiving the second indication from the monitor associated with the collection of virtual machines,
  initiate relocating, by the cloud controller, the collection of virtual machines to a second cloud computing system.

9. The system of claim 8, wherein initiating relocating the collection of virtual machines to a second cloud computing system comprises terminating the collection of virtual machines of the first cloud computing system and sending a message to a cloud controller of the second cloud computing system to restart the collection of virtual machines on the second cloud computing system.

10. The system of claim 8, further comprising receiving an indication that an application running on the individual virtual machine has failed in view of an escalation policy for an application.

11. The system of claim 10, further comprising, when the application has failed, terminating and restarting the individual virtual machine.

12. A non-transitory computer readable storage medium including instructions that, when executed by a processing device, cause the processing device to:
 receive, by a monitor associated with a collection of virtual machines residing on a host machine of a first cloud computing system, from a monitor associated with an individual virtual machine of the collection of virtual machines, a first indication that the individual virtual machine has failed in view of an escalation policy for the individual virtual machine;
 responsive to the monitor associated with the collection of virtual machines receiving the first indication from the monitor associated with the individual virtual machine,
  terminate and restart the collection of virtual machines by the monitor associated with the collection of virtual machines residing on the host machine;
 receive, by a cloud controller of a first cloud computing system, a second indication that the collection of virtual machines has failed in view of an escalation policy for the collection of virtual machines; and
 responsive to a monitor associated with the cloud controller of the first cloud computing system receiving the second indication from the monitor associated with the collection of virtual machines,
  initiate relocating, by the cloud controller, the collection of virtual machines to a second cloud computing system.

13. The non-transitory computer readable storage medium of claim 12, wherein, when the processing device initiates relocating the collection of virtual machines to a second cloud computing system, the processing device terminates the collection of virtual machines of the first cloud computing system and sends a message to a cloud controller of the second cloud computing system to restart the collection of virtual machines on the second cloud computing system.

14. The non-transitory computer readable storage medium of claim 12, wherein the processing device is to receive an indication that an individual virtual machine of the collection of virtual machines has failed based on an individual virtual machine escalation policy.

15. The non-transitory computer readable storage medium of claim 14, wherein the processing device is to receive an indication that an application running on the individual virtual machine has failed in view of an escalation policy for an application.

16. The non-transitory computer readable storage medium of claim 15, further comprising, when the application has failed, the processing device terminates and restarts the individual virtual machine.

\* \* \* \* \*